United States Patent

[11] 3,597,972

| [72] | Inventor | Francis E. Ryder<br>Lake Zurich, Ill. |
|------|----------|---------------------------------------|
| [21] | Appl. No. | 855,917 |
| [22] | Filed | Sept. 8, 1969 |
| [45] | Patented | Aug. 10, 1971 |
| [73] | Assignee | Illinois Tool Works Inc.<br>Chicago, Ill. |

[54] COMBINED LEVEL INDICATOR AND HYDROMETER
7 Claims, 6 Drawing Figs.

[52] U.S. Cl. .................................................. 73/291,
73/440, 73/447
[51] Int. Cl. ............................................. G01n 9/18,
G01f 23/02
[50] Field of Search .......................................... 73/447-
—451, 441, 32, 291, 327; 136/182.0, 182.3, 182.4

[56] References Cited
UNITED STATES PATENTS

| 829,460 | 8/1906 | Bunce | 73/440 |
|---------|--------|-------|--------|
| 1,424,730 | 8/1922 | Linebarger | 73/440 |
| 1,556,185 | 10/1925 | Walker | 73/440 X |
| 1,648,412 | 11/1927 | Linebarger | 136/182 (.5) |
| 2,469,560 | 5/1949 | Jutte | 73/291 |
| 3,362,224 | 1/1968 | Melone | 73/327 |
| 3,417,614 | 12/1968 | Ryder | 73/327 |

Primary Examiner—Louis R Prince
Assistant Examiner—Daniel M. Yasich
Attorneys—Olson, Trexler, Wolters & Bushnell, Robert W. Beart, Michael Kovac, Barry L. Clark and Jack R. Halvorsen

ABSTRACT: A liquid level indicator and hydrometer for use in determining the liquid level of a fluctuating liquid as well as determining simultaneously the specific gravity thereof. The device contemplates a hollow body operatively mounted on the lower extremity of a light-transmitting liquid level indicator with a plurality of colored float means having differing specific gravities which are optically visible through the light-transmitting liquid level indicator simultaneously with the readout of the liquid level.

Patented Aug. 10, 1971  3,597,972
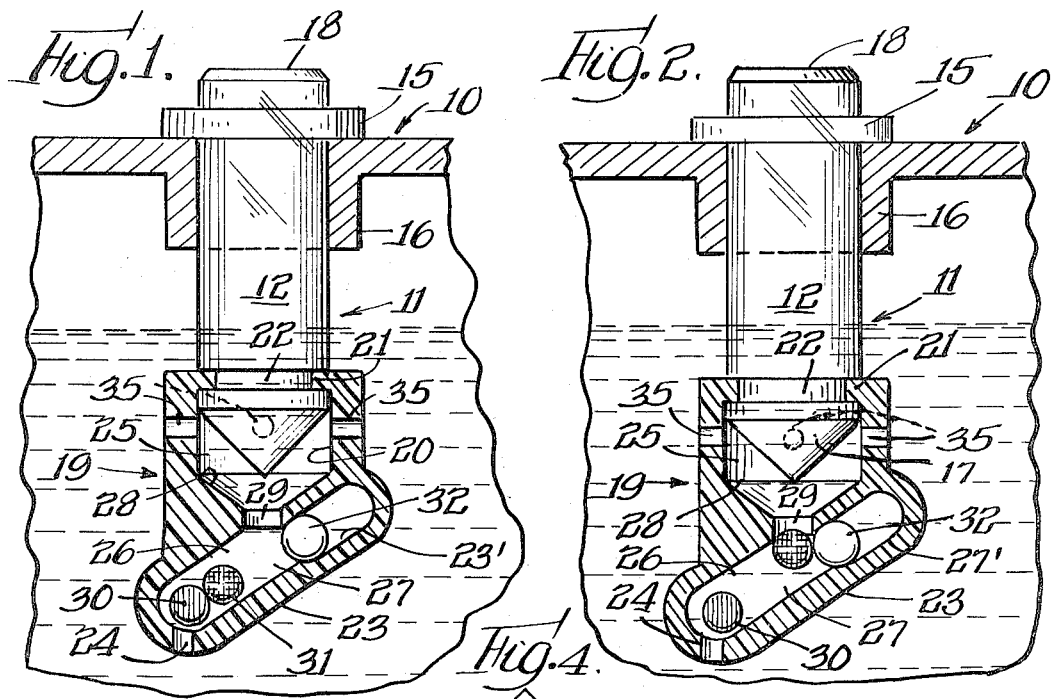
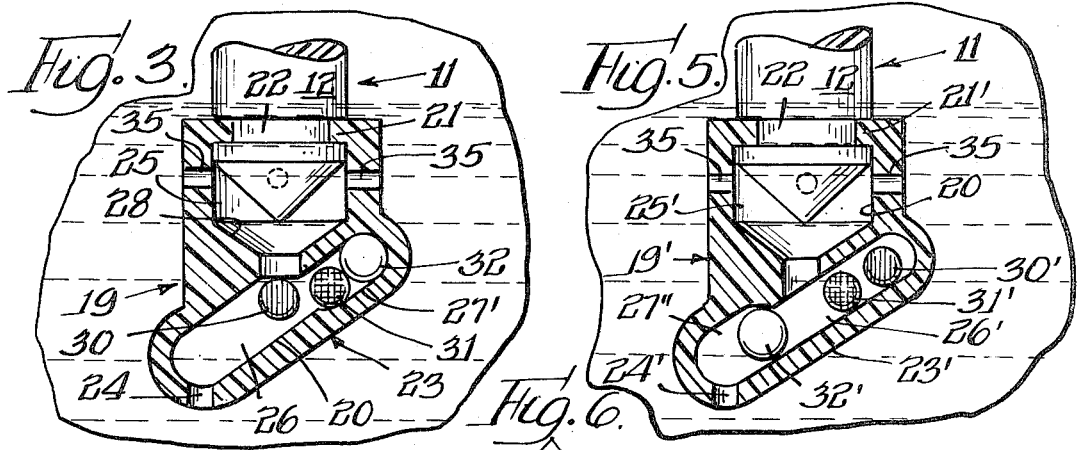
Inventor
Francis F. Ryder
By: Olson, Trexler, Wolters & Bushnell attys

COMBINED LEVEL INDICATOR AND HYDROMETER

SUMMARY

The present invention relates generally to combined liquid level indicator and hydrometers adapted to be mounted in the upper wall of a container, as for example, the upper wall of a conventional storage battery. The embodiments of the invention disclosed in the present application include a visual liquid level indicating device having a reflecting surface at the inner end of a transparent body member and an annular section coincident with or projecting laterally outwardly from the outer end of the body member to concentrate light rays reflected from the inner end of the body member from different positions. In order to read the specific gravity of the electrolyte or other fluid within the container the hydrometer may be symmetrically formed of substantially identical halves which may be either adhesively adhered together or provided with other similar forms of fastening means. When the liquid level of the battery or radiator with which the indicator is utilized covers the end of the indicator a normal black or darkened pattern will be obtained at the upper end. If the specific gravity of the liquid is low, an orange or red colored ball of the ball-indicating means will not float and will drop down and be visible at the end of the indicator as described in my copending application Ser. No. 855,928, filed Sept. 8, 1969 of which this application is a continuation. The device of this invention operates in a reverse manner from that copending application of which this is a continuation, wherein in this application the balls of the ball indicating means of the hydrometer become visible as the density increases. In another embodiment of the three-ball form it may be inverted to provide a reversal of the reading. The combined liquid level indicator and hydrometer of this invention utilizes three balls and indicates three specific gravity conditions. When the specific gravity is low, no balls are visible. When the density or specific gravity of the liquid increases, the yellow ball floats up the incline till it bumps into a green ball, which is heavier and of a larger diameter. At this condition, the yellow ball is visible. If the density increases to a point greater than that of the combined weight of all three balls, then they all float upwardly until the red ball is visible and the liquid is at a relatively high density. In the case of a battery electrolyte, a cell of the battery is at full charge. The red ball is visible since the green ball is larger as there is a restriction in the chamber that prevents the downward movement of the green ball but allows the yellow ball to pass upwardly in the same chamber with the green ball. In the embodiment in which the three ball hydrometer unit is inverted, with the liquid low, only a bright spot shows. With the liquid level up, a dark spot shows and the density or the specific gravity of the liquid is high. With the liquid level up and of medium density, the yellow ball shows. When the liquid level is up and the liquid is of low density, the red ball appears.

The present invention relates to a novel combined fluid or liquid level indicator and hydrometer, and more specifically to visually observable fluid level indicators and hydrometers. In my copending application for a combined liquid level indicator and hydrometer, a single-ball float indicating means is used indicating a low specific gravity condition by the appearance of the single ball, whereas in the present invention the particular construction uses a plurality of balls indicating a plurality of different specific gravity conditions.

It will become apparent that various uses for combined fluid level indicators and hydrometers of the type contemplated herein may suggest themselves. However, in order to facilitate the present disclosure, it is observed that it is frequently necessary to check the level of the electrolyte in storage batteries installed in vehicles or other places, and it is also frequently necessary to check the level of the liquid and specific gravity thereof in the cooling system of a vehicle. As is well known, the usual practice for checking the liquid level or specific gravity in either storage batteries or cooling systems contemplate structures so as to permit a look inside. Various devices have heretofore been proposed for aiding in the checking of the liquid level in batteries, radiators and the like, and devices have also been proposed for checking the specific gravity of the liquid, but no heretofore proposed device has come into general use for checking both liquid level and specific gravity.

It is an important object of the present invention to provide a novel combined fluid level indicator and hydrometer which is of simple and economical construction and which is highly effective and easily readable.

A more specific object of the present invention is to provide a novel combined fluid level indicator which may be readily assembled with storage batteries, radiators and the like for permitting the level of the fluid and the specific gravity therein to be determined without removal of the battery or radiator caps.

Still another important object of the present invention is to provide a novel combined liquid level indicator and hydrometer comprising a member of light-transmitting material adapted to be assembled with a battery, radiator or the like, and shaped so as to collect and concentrate rays of light and reflect such light at predetermined areas with a relatively high intensity when the liquid within the battery or radiator recedes so as to avoid contact with the member, the intensity of the reflected light providing a readily observable indication of the liquid level and ball float means of the hydrometer used in connection therewith indicating the relative specific gravity within a predetermined range of specific gravity.

Still another object of the present invention is to provide a novel indicator of the above-described capable of detecting and indicating a plurality of different liquid levels and specific gravities within a predetermined range of specific gravity.

Other objects and advantages of the present invention will become apparent from the following description and the accompanying drawing wherein:

FIG. 1 is a view in elevation illustrating a storage battery or the like utilizing a combined fluid level indicator and hydrometer incorporating features of the present invention, and indicating the liquid level relatively up and low specific density;

FIG. 2 is a view in elevation similar to FIG. 1 with the ball-indicating means illustrative of the relative position of the liquid level being up and the liquid being indicated as having a medium density;

FIG. 3 illustrates a partial view of the combined liquid level indicator and hydrometer of FIG. 1 and FIG. 2, and illustrating the position of the ball indicating means with the liquid up and having a high density;

FIG. 4 schematically illustrates different levels of the liquid when viewed through the top viewing surface and also the density of the liquid with the liquid up by the position of the colored ball indicating means on the liquid background;

FIG. 5 illustrates another embodiment of the hydrometer means in which the three-ball indicating means of the hydrometer means is inverted to indicate the level of the liquid in its low and high position and the relative densities thereof; and FIG. 6 is a schematic view similar to that of FIG. 4 but in which the three-ball indicating means of the hydrometer are inverted and illustrating the light pattern as viewed from the top viewing surface when the liquid is low, the liquid up and the density high, liquid up and density medium and liquid up and density low as determined by the position of the colored ball indicating means.

Referring now more specifically to the drawing wherein like parts are designated by the same numerals throughout the various figures, a storage battery 10, radiator or other container is particularly shown in FIGS. 1 and 2, which battery utilizes a combined fluid level indicator and hydrometer 11, constructed in accordance with features of the present invention in association with one of the cells of the battery. As is apparent from FIGS. 1 and 2, an upper end of the combined fluid level indicator and hydrometer 11 projects above the battery and is exposed and is visible from positions above and at all sides of the battery. Each combined liquid level indicator and hydrometer 11 is constructed as will be described in detail below so that under various handicaps, it may be easily and accurately read.

As shown best in FIGS. 1, 2, 3 and 5, each combined liquid level indicator and hydrometer 11 comprises a liquid level indicating member or light-transmitting means 12, which may be in the form of rod or other shape formed from a light-transmitting material such as an acrylic, glass, styrene, or other clear or partially clear material. The member 12 is preferably elongated so that it may be mounted in a wall of the battery or fluid vessel or in a filter cap of a battery with an upper end thereof exposed and a lower end thereof projecting downwardly at least to a desired level of liquid (not shown) within the vessel. In this embodiment, an annular member 15, limits the downward movement of the indicator member 11, and an annular stop 16 limits the upward movement of the combined liquid level indicator and hydrometer. The light-transmitting means 12 at its lower end is provided with a conical tip section, and as disclosed in the U.S. Pat. to Melone, No. 3,362,224, granted Jan. 9, 1968, the light rays impinging upon the upper end or top viewing surface 18, of the device are collected and concentrated within the device and refracted in a manner providing a relatively high concentration of light rays emitting from the prism surfaces and the end surface whereby the prism and the end surface are highly luminous. In other words, the light transmitting means 12 is well lighted and easily visible when the liquid level is below the reflecting surface and the contrast between the appearance of the prism when it is lighted and when it is dark upon immersion of the surface in the liquid is readily determined.

A hydrometer means 19, preferably formed from symmetrical halves, provide a hollow body section 20, within which the conical tip 17 extends. An annular portion 21 is complementally formed to an annular means 22 of the light-transmitting means 12 to which the symmetrical halves of the hydrometer means 19 are fixed by gluing or by other suitable manner. The hydrometer means 19 is also formed with an inclined portion 23 provided with an opening 24 for admission of liquid within the device to be tested and an inverted conical-shaped chamber 25 is operatively connected to an inclined chamber 26. The inclined chamber 26 includes a lower tubular formed chamber 27, and an upper enlarged tubular chamber 27'. These chambers 26 and 27' are operatively connected to the inverted conically shaped chamber 28 through an opening 29. Referring to FIG. 1, 2 and 3, balls 30 and 31 are operatively mounted in the lower chamber 27 and a ball 32 is operatively mounted in the upper large chamber 27'. These balls are made with predetermined known specific gravities and are preferably made in different colors. For example, ball 30 may be red, ball 31 may be yellow and ball 32 may be green.

In assembling the symmetrical halves of the hydrometer means 19 on the light-transmitting member 12 one-half of the hydrometer means 19 is positioned for example as shown in FIG. 1, and the balls 30, 31, and 32 are placed in position as shown, and the other half after suitable adhesive has been applied is affixed in place to the respective first half as assembled in place. It is also in the scope of the invention that the balls may be assembled as described and the halves of the hydrometer are affixed together after which the flexibility of the annular portion 21 permits it to be forced in position on the annular means 22 of the light-transmitting means 12. Other means will suggest themselves to one skilled in the art without departing from the scope of the invention. It is preferred that the halves of the hydrometer means shall be suitably molded or formed from black polyethylene material. This color is preferred to provide clearer images of the various ball-indicating means for indicating the different specific gravities of the liquid being tested and to provide a bright image for the low-level position of the liquid and suitable dark image when the liquid level is up.

Referring to FIGS. 1—4, the operation of the combined liquid level indicator and hydrometer will be described. With the liquid level indicator in its lowermost position as shown in FIG. 1, and with no liquid in the chamber 25, only the bright image X will appear indicating that the liquid is low and obviously with the balls in the position of FIG. 1, no specific gravity may be determined. Again referring to FIG. 1, and FIG. 4, but where the liquid in the chamber 25 surrounds the conical tip section 17 of the light-transmitting means, referring to FIG. 4, a dark image A may be seen at the top viewing surface 18, indicating that the liquid is up and that the density or specific gravity of the liquid is low. As described with reference to FIG. 1, when the specific gravity of the fluid within the hydrometer is low, none of the three balls are visible. When the density or specific gravity of the liquid increases, the balls will take the position as illustrated in FIG. 2. When the density of specific gravity of the liquid increases, for example, in the charging of a storage battery, the yellow ball 31 floats up the inclined passage 27, till it bumps into the green ball 32, which has a higher specific gravity and is heavier and of a larger diameter than the ball 31. At this condition, the yellow ball 31 is visible as indicated in the image B showing the yellow ball 31 on a dark background, when viewed through the top viewing surface 18. Referring to FIG. 3 and FIG. 4 with the balls in the position as shown in FIG. 3, if the density or specific gravity increases to a point greater than that of the combined specific gravity and weight of all three balls then they all float upward till the red ball 30, as shown on the image C of FIG. 4, on a dark background when viewed in the top viewing surface indicating that the liquid is up and of relatively high density or specific gravity. Referring to FIG. 3, since the green ball 32 is larger there is a restriction in the chamber 27' that prevents its downward movement but allows the yellow ball 31, to pass to the position shown in FIG. 3. Referring to FIG. 4, it is to be noted that the size of the four images in diameter correspond substantially to the diameter of the annular means 22, and therefore, that the outer diameter of the image viewed corresponds to the cross-sectional area of the annular means 22.

Referring to FIG. 5 and FIG. 6, the three-ball unit of FIG. 5 is inverted with respect to the three-ball unit of FIG. 1 through FIG. 3. In this embodiment, the green ball 32' is in the lower chamber 27'' and the red ball 30' and the yellow ball 31' are in the inclined chamber 26' which is inverted with respect to position as chamber 26 of FIG. 3. The position of the red ball 30' and the yellow ball 31' is also reversed with respect to the position of the red ball 30 and the yellow ball 31. In the assembly of the modified embodiment of the hydrometer 19' the halves of the hydrometer means 19' are first assembled with one-half mounted on the light-transmitting means 12, and with the three balls positioned as shown in FIG. 5, after which the other half of the hydrometer means is adhesively affixed or otherwise secured together. However, as previously described with reference to the first embodiment, it is within the scope of this invention that the halves of the hydrometer means may be assembled together and then assembled over the conical tip section 17, so that the annular portion 21' complementally engages the annular means 22 of the light-transmitting means 12.

Referring to FIG. 6, in the inverted position of the three-ball unit of FIG. 5, the images of the liquid and densities are relatively compared in FIG. 6, with respect to the position of the ball-indicating means. Image X' shows the liquid as being low and would compare to the position of the balls in FIG. 5. Image A' with the liquid up in the chamber 25' surrounding the conical tip section 17 and with the liquid of high density shows a dark pattern as viewed from the top viewing surface 18. The image B' illustrates the yellow ball 31' on a dark background indicating the liquid level as being up and the density or the specific gravity medium. Referring to FIG. 5, the yellow ball 31' would move downwardly beneath the opening 29' because of the weight of the ball 31'. Thus, the embodiment of FIG. 2 and that of FIG. 5 with the ball 31' underneath the opening 29' would indicate substantially the same liquid levels and medium density. Referring again to FIG. 6, the image C' indicates the red ball 30' on a dark background, and the red ball 30' moves downwardly underneath the opening 29' moving the yellow ball 31' into the chamber 27" with the green ball 32'. In this position of the balls in the hydrometer comparable to image C' of FIG. 6, the density or specific gravity of all three balls is greater than the density of the liquid so that the hydrometer reads low density or specific gravity with the liquid level up.

It is also desired openings or holes 35 shall be formed in the upper chamber 25, of the embodiment of FIG. 1, 2 and 3, and also the upper chamber 25' of the embodiment of FIG. 5, to vent any air which may be retained in the chambers or vapor from the electrolyte or coolant so that when the liquid level indicator and hydrometer are moved downwardly to read the liquid level and specific gravity of the liquid, the various chambers of the hydrometer will become filled with fluid depending upon the level of the liquid. It is to be understood that these holes may be suitably drilled or molded without departing from the scope of the invention. It is also within the scope of the invention that sufficient clearance may be had between the complementally formed portions 21 and 22 to vent the various chambers of the hydrometer without the need for use of the openings 25.

The manner in which the liquid level indicating means 12 functions has been particularly described in the U.S. Pat. No. 3,362,224, granted to Robert R. Melone, on Jan. 9, 1968. However, it is also within the scope of the invention that the liquid level indicator of these embodiments of this invention may be modified from that as disclosed and claimed in my copending application Ser. No. 797,141, filed Feb. 6, 1969 now issued as U.S. Pat. No. 3,543,581. The combined liquid level indicator and hydrometer may be suitably raised from the lower position thereof as illustrated in FIG. 1, and FIG. 2, to intermediate positions when desired to read the particular level of the fluid within a container, and may be raised so that the upper surface of the hydrometer 19 stops against the lower edge of the annular stop 16 when it is desired to drain any fluid which may remain within the chambers of the hydrometer means from any previous reading down through the lower opening 24, and also which may discharge from the upper chamber 25 through the opening 29.

It will be apparent from the foregoing description that the present invention contemplates a very simple, inexpensive, and highly efficient combined liquid level indicator and hydrometer for indicating not only levels of liquid subject to fluctuation, but also a plurality of different specific gravity or density conditions at the heighth of the liquid which has been indicated by the liquid level indicator. If desired, the schematic illustrations of FIG. 4, and FIG. 6, for the different embodiments may be suitably printed or embossed on the battery cover to assist an operator in determining the level of the liquid and density thereof as the images are viewed through the top viewing surface of each liquid level indicator and hydrometer for each battery cell. It is also within the scope of the invention that rather than being integral part of the cover of the battery, that the combined liquid level indicator and hydrometer may be fabricated as separate members to be operatively mounted within the opening left by conventional battery cap and used as a closure for the battery also or may be used as a simple testing device for determining the level of a liquid and density thereof of an electrolyte within a radiator or other container.

While the specific embodiment of the invention are disclosed herein for the purposes of illustration, it will be understood that the combined liquid level indicator and hydrometer may vary in certain geometric respects without departing from the spirit and the scope of the appended claims.

The invention I claim is as follows:

1. A combined liquid level indicator for indicating levels of liquid subject to fluctuation, and hydrometer means for indicating the specific gravity of the liquid, comprising an elongated member of light-transmitting material having an upper end light receiving and transmitting surface and a lower end reflective surface for determining the liquid level, said hydrometer means inducing a hollow body member operatively mounted on said elongated member at the lower reflecting end and adapted to be immersed within the liquid, said hollow body member including an upper chamber surrounding said light-reflective end of said elongated member and having means for admitting liquid to said upper chamber for measuring liquid level and a tubular lower chamber angularly disposed in inclined vertical relation to and extending on opposite sides of the axis of said elongated member and said hollow body, access means for communication between said upper chamber and said lower tubular chamber and positioned in line with said lower reflective surface and indicating ball float means operatively mounted within said lower chamber for indicating the specific gravity of the liquid within which the hydrometer means is immersed, said lower chamber means comprising spaced substantially parallel walls which are inclined relative to the axis of said elongated member and hollow body within which the indicating ball float means are permitted to move subject to the specific gravity condition of the liquid in which the indicator and hollow body are immersed, said ball means being adapted to be positioned adjacent said access means at certain specific gravities and being visible through said elongated member at the light receiving and transmitting surface to thereby indicate at least one specific gravity condition.

2. A combined liquid level indicator and hydrometer means as set forth in claim 1 wherein the lower chamber means includes at lest two aligned communicating portions of differing diameters, and said ball float means comprises initially one ball of one density in one of said portions, and another ball of another density in the other portion, said balls when immersed in liquid being operable to indicate substantially two specific gravity conditions.

3. A combined liquid level indicator and hydrometer means as set forth in claim 1 wherein the lower chamber means comprises at least two portions, and initially two balls of different densities in one of said portions, and another ball of another density in the other portion, said balls operable to indicate substantially three specific gravity conditions.

4. A combined liquid level indicator and hydrometer means as set forth in claim 1, wherein the lower chamber means comprises two portions, and said ball float means comprises initially two balls of two different colors and two different densities in one of said portions, and another ball of another color and another density in the other portion, said lower chamber having a lower portion and an upper portion operatively connected together, said lower portion operatively mounting initially the aforesaid two balls of two different colors and densities, and said another ball of another color and density operatively mounted in the upper portion, said upper portion permitting the upper one of the lower balls to pass into the upper portion, whereby when the density of the liquid increases the upper ball of lower portion floats up the incline provided by the inclined walls until it bumps into the ball of the upper portion, said last-mentioned ball being heavier and larger in diameter, so that the upper ball of the lower portion is positioned in line with said access means and is visible in the liquid level indicator, and if the density of the liquid increases to a point greater than the combined weight of all three balls then all three balls float upwardly until the lowermost ball in the lower portion is visible in the liquid level indicator, and restriction means is provided between the upper and lower portions, and as the ball in the upper portion is larger, the restriction means prevents the downward movement of the larger ball in the upper portion but allows the upper ball of the lower portion to pass into the upper portion.

5. A combined liquid level indicator and hydrometer mean as set forth in claim 1, wherein the lower chamber means comprises two portions and said ball float means comprises initially two smaller balls of two different colors and two different densities in one of said portions, and another larger ball of another color and density in the other portion, said portions comprising a lower portion and an upper portion operatively connected together, said lower portion operatively mounting the aforesaid larger ball, said upper portion operatively mounting the aforesaid two smaller balls, said lower portion permitting the lower one of the two balls of the upper portion to pass into the lower portion, whereby in one position of the balls the liquid level indicator indicates that the liquid is low, and in another position of the liquid level indicator with the level of the liquid up, and as the specific gravity of the liquid changes, in one position of the balls high density is indicated, in another position of the balls medium density is indicated, and in a third position of the balls, low density is indicated.

6. A combined liquid level indicator and hydrometer means as set forth in claim 1, wherein the hollow body comprises a vertical upper chamber operatively connected to the light-transmitting means by an inwardly directed flange engaging an annular groove axially spaced from said lower end and providing an encircling chamber having means to admit the liquid, the level of which is to be indicated, said hollow body also including a lower tubular chamber having a lower portion and an upper portion operatively connected together and centrally disposed having access means communicating with the bottom of said vertical chamber, said lower and upper portions inclined downwardly, said upper portion operatively mounting a ball, said lower portion operatively mounting two balls, said lower portion permitting the upper ball thereof to be positioned in line with said access means and become visible in said light-transmitting means with the liquid up and of medium density, and said upper ball of the lower portion adapted to pass into the upper portion permitting the lower ball of the lower portion to become visible in said light-transmitting means with the liquid up and of high density, and with the balls of the upper and lower portions in their lower position, the balls are not in line with said access means and hence not visible with the liquid up and of low density.

7. A combined liquid level indicator and hydrometer means as set forth in claim 1, wherein said lower tubular chamber includes a lower portion and an upper portion operatively connected together and to the upper vertical chamber, said lower portion operatively mounting a ball, said upper portion operatively mounting two balls, said upper portion permitting the lower ball thereof to become visible with the liquid up and of medium density, and said lower ball of the upper portion adapted to pass into the lower portion permitting the upper ball of the upper portion to become visible with the liquid up and of low density, and with the balls of the upper and lower portions in their upper positions, the balls are not visible with the liquid up and of high density.